(12) United States Patent
Peppard et al.

(10) Patent No.: US 9,851,160 B2
(45) Date of Patent: Dec. 26, 2017

(54) MOUNTING ASSEMBLY FOR HEAT EXCHANGER COIL

(71) Applicant: TRANE INTERNATIONAL INC., Piscataway, NJ (US)

(72) Inventors: Gregory Martin Peppard, Clarksville, TN (US); Jennifer Lynn Caudill, Crofton, KY (US); Michael Griffith, White Bluff, TN (US); Jun Wang, Clarksville, TN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 728 days.

(21) Appl. No.: 14/268,752

(22) Filed: May 2, 2014

(65) Prior Publication Data

US 2014/0326435 A1 Nov. 6, 2014

Related U.S. Application Data

(60) Provisional application No. 61/819,166, filed on May 3, 2013.

(51) Int. Cl.
| | |
|---|---|
| *F28F 9/007* | (2006.01) |
| *F28F 9/00* | (2006.01) |
| *F28D 1/047* | (2006.01) |
| *B23P 15/26* | (2006.01) |

(52) U.S. Cl.
CPC .......... *F28F 9/001* (2013.01); *F28D 1/0475* (2013.01); *F28F 9/002* (2013.01); *B23P 15/26* (2013.01); *F28F 2009/004* (2013.01); *Y10T 29/4935* (2015.01)

(58) Field of Classification Search
CPC ......... F28D 1/0475; F28F 9/001; F28F 9/002; F28F 9/004; F28F 9/013; F28F 2009/0131
USPC .................................................. 165/145, 149
See application file for complete search history.

(56) References Cited

U.S. PATENT DOCUMENTS

| | | | |
|---|---|---|---|
| 2,354,865 A * | 8/1944 | Kucher et al. ........ | F28D 1/0333 165/130 |
| 3,055,349 A | 9/1962 | Hamilton et al. | |
| 3,434,531 A | 3/1969 | Hochmuth et al. | |
| 3,554,168 A | 1/1971 | Woebcke | |
| 4,550,777 A | 11/1985 | Fournier et al. | |
| 5,279,360 A * | 1/1994 | Hughes et al. ......... | F25B 39/02 165/111 |

(Continued)

FOREIGN PATENT DOCUMENTS

CN 101846465 9/2010

*Primary Examiner* — Allen Flanigan
(74) *Attorney, Agent, or Firm* — Hamre, Schumann, Mueller & Larson, P.C.

(57) ABSTRACT

A multi-row heat exchanger coil includes a first row of coil, a second row of coil positioned generally parallel to the first row of coil, a bent portion fluidly communicating the first and second rows of coil, an interior space formed between the first and second rows of coil, and a mounting assembly. The mounting assembly includes at least one connection member configured to connect the first and second rows, thereby securing the first and second rows of coil to each other, a mounting member configured to prevent airflow from exiting from the interior space at a side of the multi-row heat exchanger coil, and fastening mechanism configured to attach the mounting member to the connection member.

14 Claims, 5 Drawing Sheets

(56) References Cited

U.S. PATENT DOCUMENTS

| | | | |
|---|---|---|---|
| 5,314,013 A * | 5/1994 | Tanabe | F28D 1/0476 165/176 |
| 5,531,268 A * | 7/1996 | Hoshino et al. | F28D 1/0476 165/149 |
| 5,943,985 A | 8/1999 | Hartman | |
| 6,237,676 B1 * | 5/2001 | Hasegawa et al. | B60K 11/04 165/140 |
| 6,276,445 B1 * | 8/2001 | Sasano et al. | F28D 1/0435 165/135 |
| 7,198,096 B2 | 4/2007 | Parish et al. | |
| 7,921,904 B2 * | 4/2011 | Matter et al. | F28D 1/0417 165/150 |
| 8,117,860 B2 | 2/2012 | Stone et al. | |
| 2002/0056541 A1 * | 5/2002 | Kokubunji et al. | B60K 11/04 165/67 |
| 2007/0193731 A1 * | 8/2007 | Lamich et al. | F28D 7/1623 165/149 |
| 2010/0181058 A1 | 7/2010 | Huazhao et al. | |
| 2011/0139420 A1 | 6/2011 | Wang | |
| 2011/0139423 A1 | 6/2011 | Troutman | |
| 2011/0247791 A1 | 10/2011 | Jiang et al. | |
| 2011/0315362 A1 | 12/2011 | Jiang et al. | |
| 2012/0227944 A1 | 9/2012 | Moisidis et al. | |
| 2013/0240192 A1 * | 9/2013 | Samuelson et al. | F28D 1/05375 165/176 |

* cited by examiner

MOUNTING ASSEMBLY FOR HEAT EXCHANGER COIL

FIELD

This disclosure relates generally to refrigeration systems, and more particularly, but not by way of limitation, to heat exchanger coils used in refrigeration systems.

BACKGROUND

Heat exchanger coils are generally attached to a cabinet wall of an air handler of an HVAC system, or other suitable wall surfaces, such as a wall surface in a cooling space. Various configurations of mounting assemblies are used for mounting heat exchanger coils.

SUMMARY

Some embodiments of a mounting assembly for mounting a multi-row heat exchanger coil can be configured to have at least one connection member that connects a first row of coil and a second row of coil, thereby securing the first and second rows to each other, and a mounting member positioned generally in parallel with the connection member for mounting of the multi-row heat exchanger coil.

Moreover, the connection member can be positioned in a vicinity of a bent portion of the multi-row heat exchanger coil, thereby enhancing strength in a bent portion of the multi-row heat exchanger coil.

Further, the mounting member can be configured to have a generally L-shape cross section, including a first barrier sheet positioned generally in parallel with the connection member to prevent airflow from exiting from an interior space formed between the first and second rows of coil at an attachment side of the multi-row heat exchanger coil, and a second barrier sheet positioned generally perpendicular to the first barrier sheet to prevent airflow from bypassing the multi-row heat exchanger coil from the attachment side and entering into a cooling space.

To assemble a mounting assembly, at least one connection member is attached to a first row of a heat exchanger coil before the first row is folded onto a second row of coil. The first and second rows of the heat exchanger coil are then folded onto each other. The connection member is then attached to the second row of coil, thereby securing the first and second rows to each other. A mounting member is then attached to the connection member.

Particular embodiments of a mounting assembly for mounting a multi-row heat exchanger coil such as for example to a desired wall surface. The multi-row heat exchanger coil includes a first row of coil, a second row of coil, a bent portion that fluidly communicates the first and second rows of coil to each other, an interior space formed between the first and second rows of coil and an attachment side where the mounting assembly is attached. The mounting assembly includes at least one connection member configured to connect the first and second rows, thereby securing the first and second rows of coil to each other, a mounting member configured to prevent airflow from exiting from the interior space at an attachment side, and fastening mechanism configured to attach the mounting member to the connection member.

In some embodiments, a multi-row heat exchanger coil includes a first row of coil, a second row of coil positioned generally parallel to the first row of coil, a bent portion fluidly communicating the first and second rows of coil, an interior space formed between the first and second rows of coil, and a mounting assembly. The mounting assembly includes at least one connection member configured to connect the first and second rows, thereby securing the first and second rows of coil to each other, a mounting member configured to prevent airflow from exiting from the interior space at a side of the multi-row heat exchanger coil, and fastening mechanism configured to attach the mounting member to the connection member.

Other embodiments include a method of assembling a multi-row heat exchanger coil. The multi-row heat exchanger coil includes a first row of coil, a second row of coil, a connection section that fluidly communicates the first and second rows of coil to each other, an interior space formed between the first and second rows of coil and an attachment side where the mounting assembly is attached. The method includes attaching at least one connection member to the first row of a heat exchanger coil before the first row is folded onto the second row of coil, bending the connection section to form a bent portion, thereby allowing the first and second rows of the heat exchanger coil to be folded onto each other, attaching the connection member to the second row of coil, thereby securing the first and second rows of coil to each other, and attaching a mounting member to the connection member.

These and other embodiments described herein may provide one or more of the following benefits. First, some embodiments of a mounting assembly are configured not only for attaching a multi-row heat exchanger coil to a wall surface, but also for connecting first and second rows of coil of the multi-row heat exchanger coil, thereby securing the first and second rows of the coil to each other. Second, some embodiments of the mounting assembly are configured to have a L-shaped mounting member for preventing airflow from leaving the multi-row heat exchanger coil through an interior space formed between the first and second rows of the coil, rather than passing through both first and second rows of the coil, thereby increasing efficiency of the multi-row heat exchanger coil effectively. Third, in some embodiments, the mounting assembly can be positioned in a vicinity to a bent portion of the multi-row heat exchanger coil, thereby enhancing strength in a bent portion of the multi-row heat exchanger coil. Fourth, in some embodiments, the mounting assembly can help prevent airflow from exiting from an interior space formed between the first and second rows of coil at an attachment side of the multi-row heat exchanger coil.

The details of one or more embodiments of the mounting assembly are set forth in the accompanying drawings and the description below. Other features, objects, and advantages of the mounting assembly will be apparent from the description and drawings, and from the claims.

DESCRIPTION OF THE DRAWINGS

Like reference symbols in the various drawings indicate like elements.

DETAILED DESCRIPTION

Some embodiments of a mounting assembly for mounting a multi-row heat exchanger coil can be configured to have at least one connection member that connects a first row of coil and a second row of coil, thereby securing the first and second rows to each other, and a mounting member positioned generally in parallel with the connection member for mounting of the multi-row heat exchanger coil.

Moreover, the connection member can be positioned in a vicinity of a bent portion of the multi-row heat exchanger coil, thereby enhancing strength in a bent portion of the multi-row heat exchanger coil.

Further, the mounting member can be configured to have a generally L-shape cross section, including a first barrier sheet positioned generally in parallel with the connection member to prevent airflow from exiting from an interior space formed between the first and second rows of coil through an attachment side of the multi-row heat exchanger coil, and a second barrier sheet positioned generally perpendicular to the first barrier sheet to prevent airflow from passing at the attachment side of the coil and entering into a cooling space.

To assemble a mounting assembly, a connection member is attached to a first row of a heat exchanger coil before the first row is folded onto a second row of coil. The first and second rows of the heat exchanger coil are then folded onto each other. The connection member is then attached to the second row of coil, thereby securing the first and second rows to each other. A mounting member is then attached to the connection member.

The mounting assembly can be used for mounting various types of multi-row heat exchanger coils, such as condenser coils and evaporator coils. In the embodiment described below, the mounting assembly is used for mounting a two-row microchannel evaporator coil.

The terms "on," "top," "bottom," "up," "down," "front," "rear" and the like used herein are in reference to the relative positions of the multi-row heat exchanger coil, the mounting assembly for mounting of the multi-row heat exchanger coil and its constituent parts, as oriented in the specific figures being described. These terms are not meant to be limiting in any way.

Figure 1:
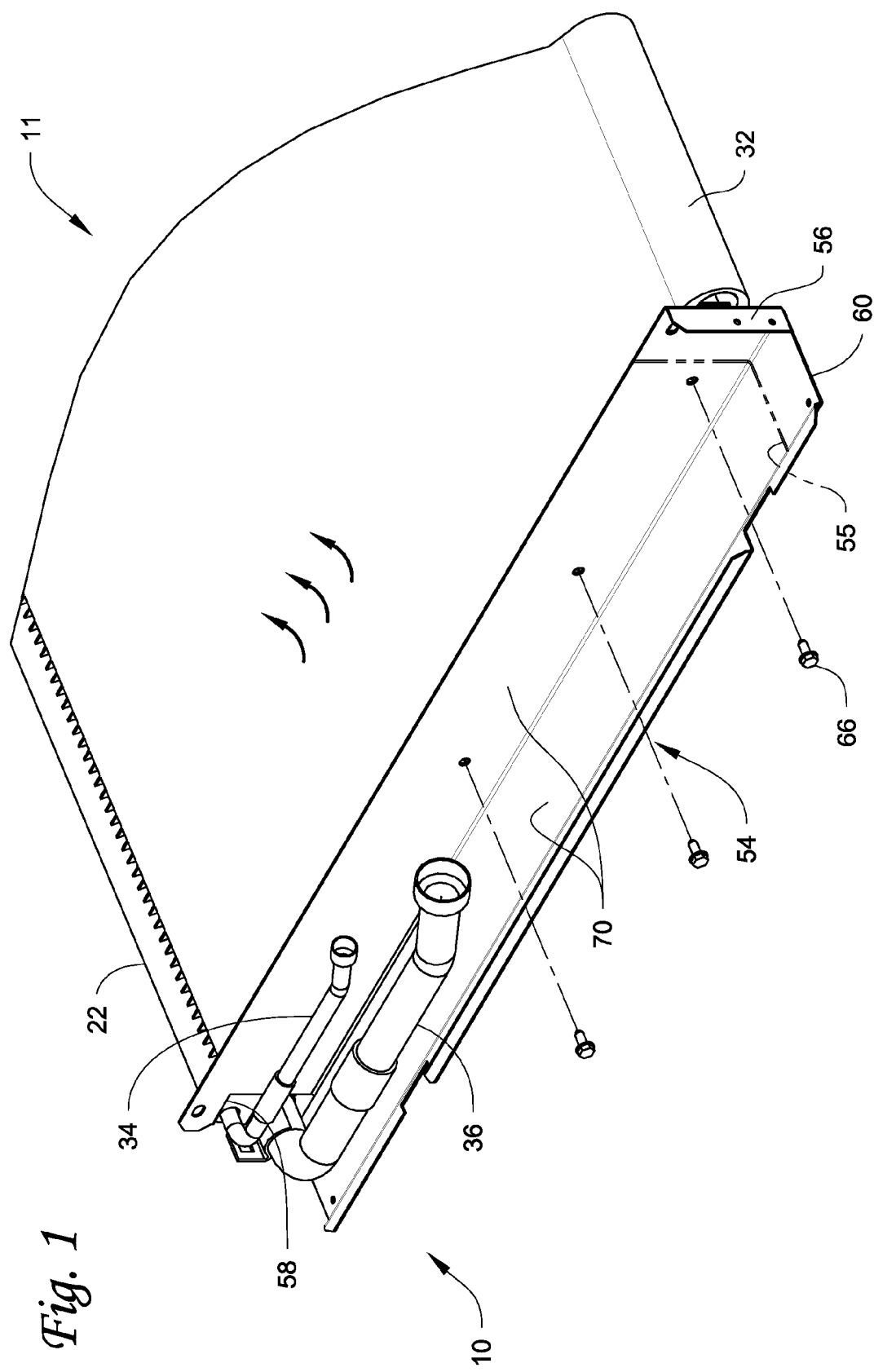
FIG. 1 is a perspective view of one embodiment of a mounting assembly mounted on a multi-row heat exchanger coil.

Referring to FIG. 1, a mounting assembly 10 is configured to mount a multi-row heat exchanger coil 11 such as for example to a desired wall surface, such as a cabinet wall of an air handler of an HVAC system, or other suitable wall surfaces, such as a wall surface in a cooling space. As used herein, the term "cooling space" refers generally to various indoor spaces, such as a cargo space of transport refrigeration systems, or a conditioned space for residence, commercial or industrial refrigeration systems.

Figure 2:
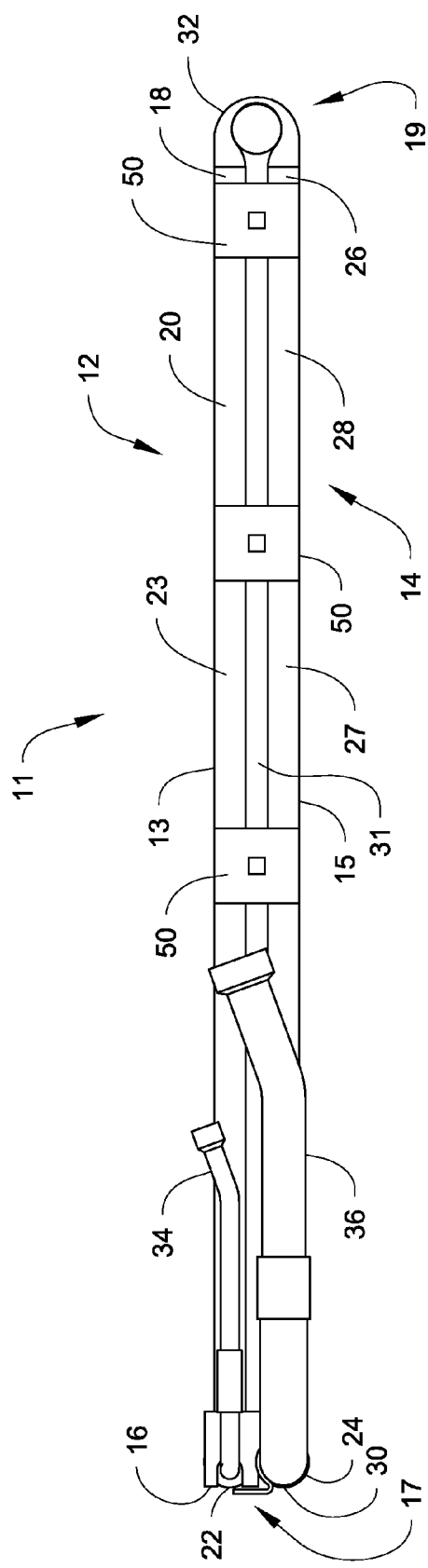
FIG. 2 is a side view of the multi-row heat exchanger coil of FIG. 1.

Referring to FIGS. 1 and 2, the multi-row heat exchanger coil 11 takes a form of a two-row microchannel evaporator coil in this embodiment. However, it is to be understood that the multi-row heat exchanger coil 11 can include more than two rows, such as three rows, four rows, five rows, or the like. The multi-row heat exchanger coil 11 includes a front side 13, a rear side 15, a first end 17, a second end 19 and an attachment side 21 (referring to FIG. 3) extending between the front and rear sides 13, 15 and between the first and second ends 17, 19. The attachment side 21 includes a first attachment side 20 of the first row of coil 12 and a second attachment side 28 of the second row of coil 14.

Still referring to FIGS. 1 and 2, the multi-row heat exchanger coil 11 includes a first row of coil 12 such as for example in a slab shape, and a second row of coil 14 also in a slab shape for example and generally parallel to the first row of coil 12. The first row of coil 12 has a free end 16, a connection end 18 and a plurality of flat tubes 23 extending between the free end 16 and the connection end 18. The first row of coil 12 also includes the first attachment side 20 for attachment of the multi-row heat exchanger coil 11 such as for example to a suitable wall surface. A first header 22 such as an inlet header is formed at the free end 16 of the first row of coil 12. The first header 22 includes an inlet tube 34 for receiving refrigerant.

Likewise, the second row of coil 14 has a free end 24, a connection end 26 and a plurality of flat tubes 27 extending between the free end 24 and the connection end 26. The second row of coil 14 also includes the second attachment side 28 corresponding to the first attachment side 20 of the first row of coil 12 which can cooperate with the first attachment side 20 for attachment of the multi-row heat exchanger coil 11 such as for example to a suitable wall surface. A second header 30 such as an outlet header is formed at the free end 24 of the second row of coil 14. The second header 30 includes an outlet tube 36 for discharging refrigerant, for example. An interior space 31 is formed between the first and second rows of coils.

Referring to FIGS. 1-2, a bent portion 32 located at the second end 19 of the multi-row heat exchanger coil 11 is formed to fluidly communicate the connection ends 18 and 26 of the first and second rows of coil 12, 14 to each other. In some embodiments, the bent portion 32 has a relatively thinner wall and can be relatively fragile compared to the other portions of the multi-row heat exchanger coil. In some embodiments, the first and second rows of coil are positioned generally parallel to each other. However, it is to be understood that the orientation of the first row of coil 12 relative to the second row of coil 14 can vary as desired.

The first and second headers 22, 30 are fluidly connected by the plurality of flat tubes 23, 27 through the bent portion 32. In some embodiments, the flat tubes 23, 27 and the bent portion 32 are integral with each other such that microchannels continue from the first row of coil 12 to the bent portion 32 and to the second row of coil 14. The flat tubes 23, 27 of the first and second rows of coil 12, 14 may be formed in some embodiments to include multiple internal passageways, or microchannels to allow efficient heat transfer for example between the airflow passing over the flat tubes 23, 27 and the refrigerant carried within the microchannels.

The first and second rows of coil 12, 14 each includes a plurality of fins coupled to and positioned between the corresponding flat tubes 23, 27. In some embodiments, the fins can be generally arranged in a zig-zag pattern between adjacent flat tubes 23, 27, aiding in the heat transfer for example between the airflow passing through the coil 11 and the refrigerant carried by the microchannels. In the embodiment as shown in FIG. 1, airflow is blown through the multi-row heat exchanger coil in a direction from the rear side 15 of the coil 11 to the front side 13 of the coil 11, as indicated by the arrows in FIG. 1. In some embodiments, the bent portion 32 does not include fins. It is to be understood that in other embodiments, the heat exchanger coil 12 can be other types of heat exchanger coils, such as tube-and-fin coils.

Figure 3:
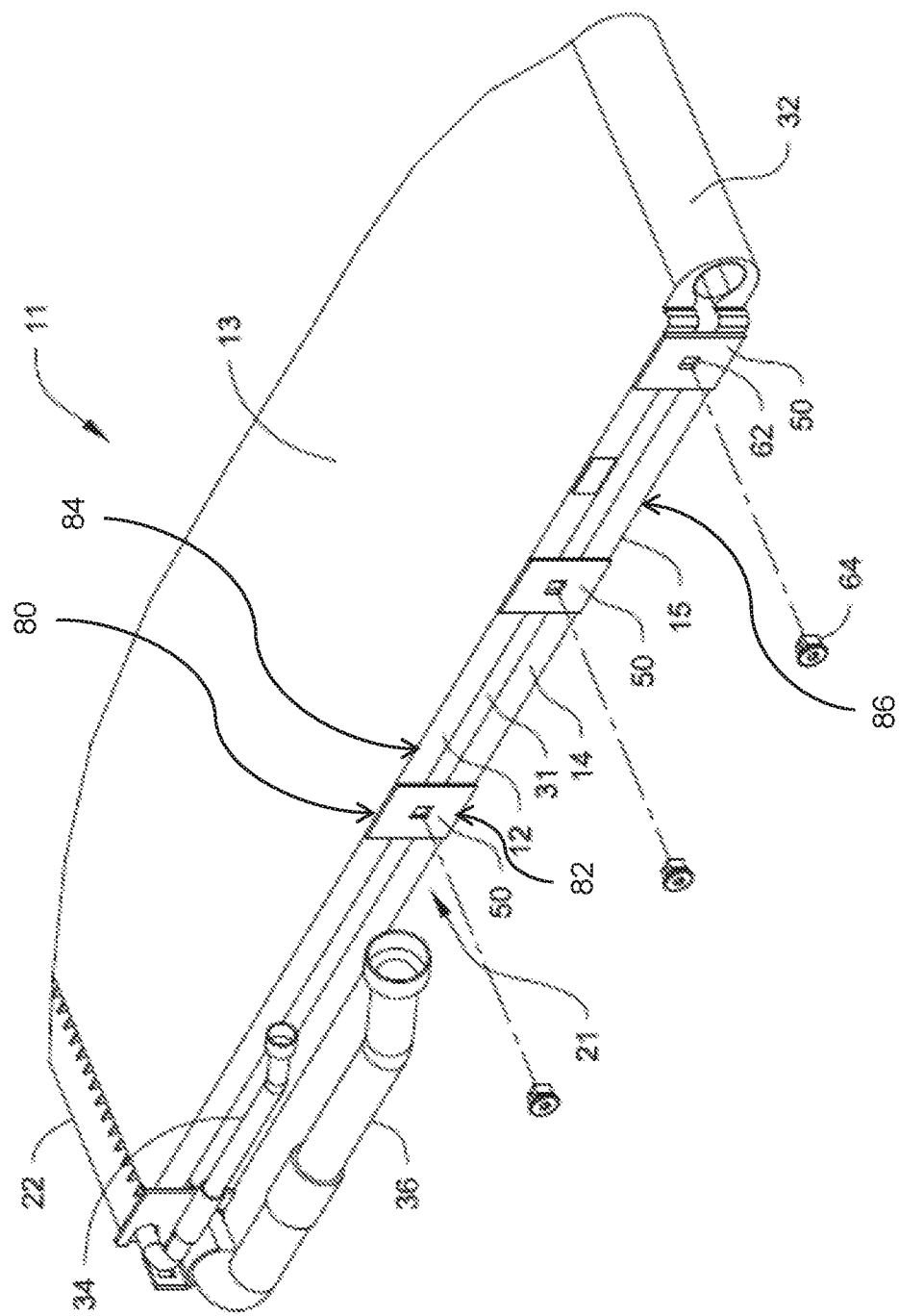
FIG. 3 is a perspective view of connection members of the mounting assembly of FIG. 1 with inserts to be inserted into respective slots defined in the connection members.
Figure 4:
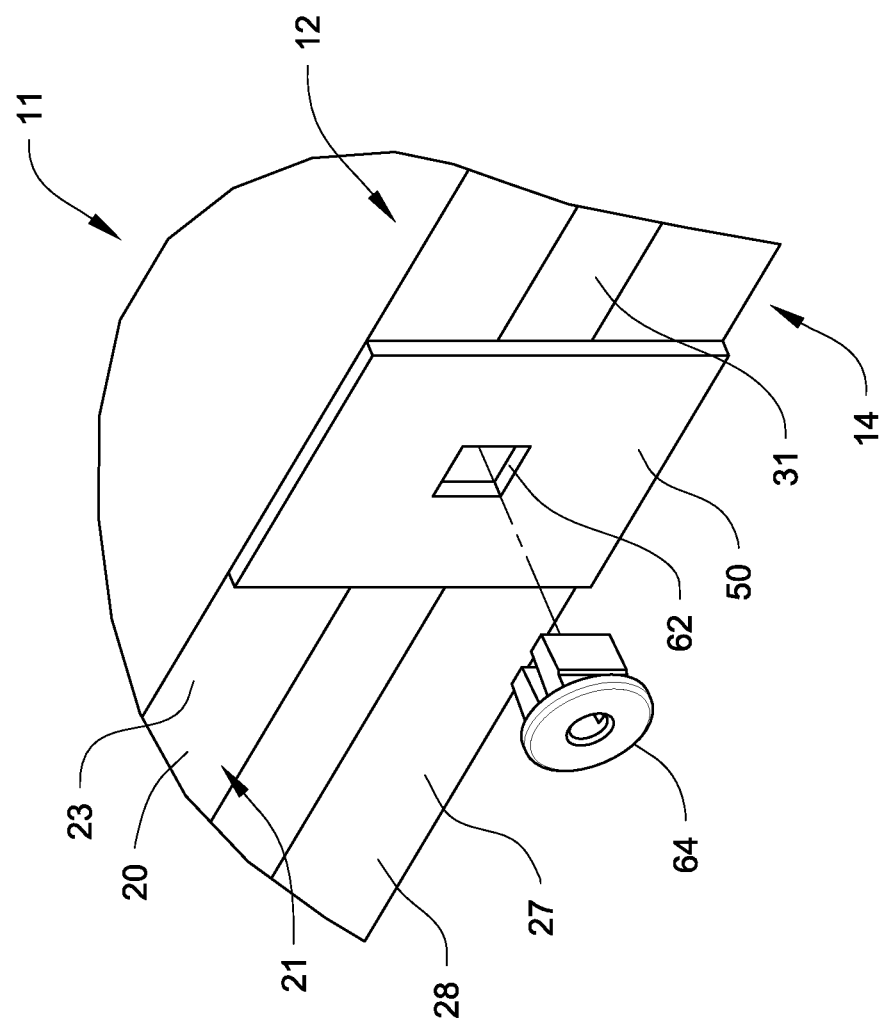
FIG. 4 is an enlarged view of FIG. 3 showing an insert to be inserted into a slot defined in a connection member.

Referring to FIGS. 1 and 3-4, the mounting assembly 10 includes a connection member 50 that connects the first and second rows of coil 12, 14, thereby securing the first and second rows of coil 12, 14 to each other. In some embodiments, the connection member 50 can be attached to the first attachment side 20 of the first row of coil 12 and a corresponding position of the second attachment side 28 of the second row of coil 14 such that the first and second rows of coil are secured to each other. In some embodiments, the connection member can be attached to the first attachment side 20 or the second attachment side 28 by suitable fastening mechanisms, such as for example by means of oven-braze or post oven-braze.

In some embodiments, the connection member 50 can be configured to interlock the first and second rows of coil 12, 14, thereby maintaining the position of the rows of coil 12, 14 relative to each other. In such instances, the connection member 50 can be made of materials that provide sufficient rigidity such as metal or other suitable rigid materials. As shown in FIGS. 3-4, in some embodiments, the connection member 50 can be positioned generally perpendicular to both the first row of coil 12 and the second row of coil 14.

As shown in FIGS. 1 and 3, in some embodiments, the mounting assembly 10 includes a plurality of connection members 50 configured to connect the first and second rows of coil to each other. The plurality of connection members 50 are located at selected locations along the length of the flat tubes 23, 27. They can be equally or unequally spaced, and different numbers of connection members can be used, for example two, three, four, five, etc.

In some embodiments, at least one connection member 50 is positioned in a vicinity of the bent portion 32 for enhancing strength in a bent portion 32 of the multi-row heat exchanger coil. Where used herein, the term "vicinity" refers to "near," "close to" or "at" the bent portion of a multi-row heat exchanger coil such that the strength of the bent portion is enhanced. It will be appreciated that the term "vicinity" can be any suitable location at which a connection member can be placed relative to the bent portion to for example enhance the strength of the bent portion.

Referring back to FIG. 1, in some embodiments, the mounting assembly 10 also includes a mounting member 54 for mounting the multi-row heat exchanger assembly 11 such as for example to a desired wall surface. The mounting member 54 can be configured to include a first barrier sheet 56 attached to the connection member(s) 50. This can help prevent airflow from exiting from the interior space 31 (referring to FIGS. 2-4 and 6) formed between the first and second rows of coil 12, 14 at the attachment side 21 of the multi-row heat exchanger coil 11.

In some embodiment, the first barrier sheet 56 is positioned next to the connection member(s) 50 and generally perpendicular to both the first row of coil 12 and the second row of coil 14. The first barrier sheet 56 is positioned close to the attachment side 21 of the multi-row heat exchanger coil 11, thereby preventing airflow from exiting from the interior space 31 at the attachment side 21.

As shown in FIG. 1, the first barrier sheet 56 extends from the first end 17 of the multi-row heat exchanger coil 11 to the second end 19 of the coil 11 and between the front side 13 of the coil 11 and the rear side 15 of the coil 11. In the illustrated embodiment in FIG. 1, the first barrier sheet 56 extends beyond the front side 13 and the rear side 15 of the coil 11. The first barrier sheet 56 can have at least one cutout area 58 to allow the refrigerant inlet tube 34 and outlet tube 36 to pass through the first barrier sheet 56.

Still referring to FIG. 1, in some embodiment the mounting member 54 can have a generally L-shape cross section 55. In such instances, the mounting member 54 can have not only the first barrier sheet 56 for preventing airflow from exiting from the interior space 31 at the attachment side 21 but also a second barrier sheet 60. The second barrier sheet 60 can be oriented generally perpendicular relative to the first barrier sheet 56, thereby enhancing rigidity in the mounting member 54.

In some embodiments, the second barrier sheet 60 can be configured to prevent airflow from bypassing the multi-row heat exchanger coil 11 from the attachment side 21 and entering into the cooling space. For example, the second barrier sheet 60 can be used to close a gap formed between the multi-row heat exchanger coil 11 and a side wall of an air handler cabinet located on the attachment side 21 of the heat exchanger coil 11, such that airflow can be prevented from bypassing the heat exchanger coil 11 from the attachment side 21 and entering into the cooling space.

Referring now to FIGS. 1-4, the mounting member 54 can be fastened to the connection member 50 by fastening mechanism such as inserts and screws. As shown in FIGS. 3-4, each connection member 50 can have a through-thickness slot 62 for retention of an insert 64. The insert 64 can be made of various suitable materials, such as plastic materials. The insert 64 can cooperate with a screw 66 to attach the mounting member 54 to the connection member 50. It is to be understood that other fastening mechanisms, such as welds, rivets, bolts, clamps, or the like, can be used to attach the mounting member 50 to the connection member 50.

Figure 5:
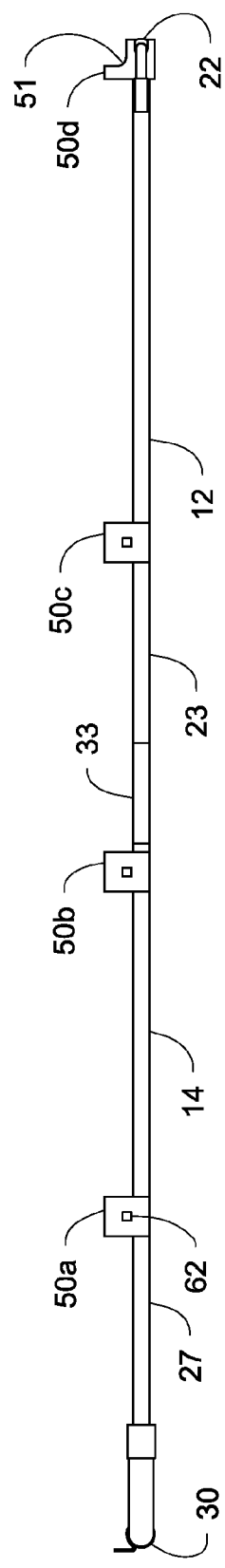
FIG. 5 is a schematic view of a further embodiment of the multi-row heat exchanger coil with each connection member attached on one of the first and second rows of coil, before the first and second rows are folded onto each other.
Figure 6:
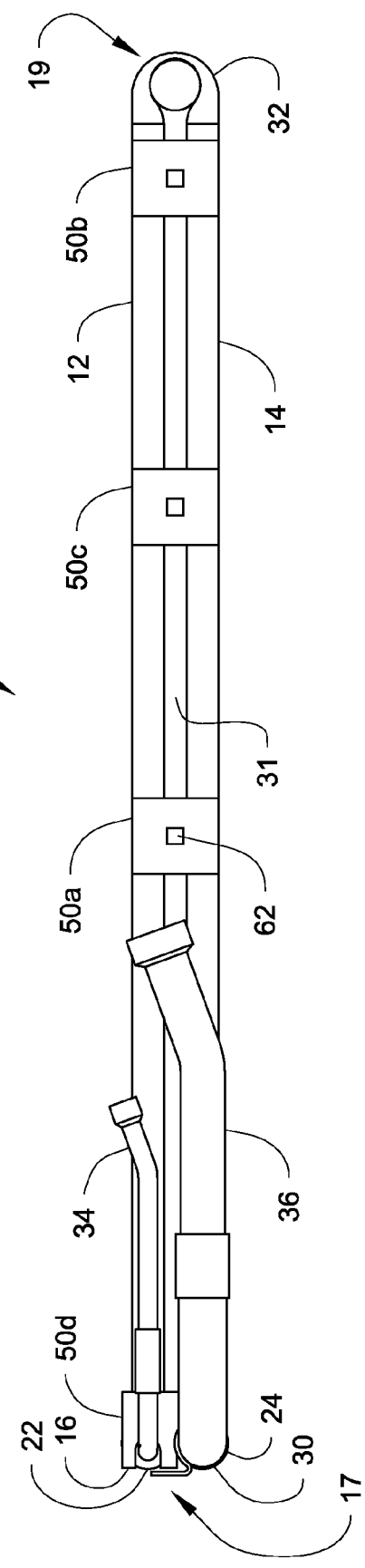
FIG. 6 is a schematic view of the connection members of FIG. 5 connecting the first and second rows of the heat exchanger coil to each other.

Referring now to FIGS. 5-6, in some embodiments, to assemble the mounting assembly 10, the connection members 50 can be attached to one or both of the first and second rows of coil 12, 14 by suitable fastening mechanism such as welds, before the first and second rows of coil 12, 14 of the multi-row heat exchanger assembly 11 are folded onto each other. In such instances, the first and second rows of coil 12, 14 are oriented in an extended position, with the first header 22 and the second header 30 positioned opposite to each other across the flat tubes 23 of the first row of coil 12, the flat tubes 27 of the second row of coil and a connection section 33.

Referring now to FIG. 3, the connection members 50 are disposed along a side of the heat exchanger coil 11. Each of the connection members 50 has a first end 80 and a second end 82 opposite to each other, with the first end 80 attached directly to an outermost tube 84 of the first row of coil 12 and the second end 82 attached directly to an outermost tube 86 of the second row of coil 14, thereby securing the first and second rows of coil 12, 14 to each other.

As shown in FIG. 5, the mounting assembly 10 has connection members 50*a*, 50*b* 50*c* and 50*d*. Among them, the connection members 50*a* and 50*b* are attached to the second row of coil 14, and the connection members 50*c* and 50*d* are attached to the first row of coil 12. The connection member 50*b* is located in a vicinity of the bent portion 32 to enhance strength in the bent portion 32. The connection member 50*d* has a cutout area 51 to allow the refrigerant inlet tube 34 and outlet tube 36 to pass through.

Referring to FIGS. 5 and 6, the connection section 33 is bent to form the bent portion 32, causing the first and second rows of coil 12, 14 to fold onto each other, allowing the connection members 50*a*, 50*b*, 50*c*, 50*d* to be staggered. Subsequently, the connection members 50*a*, 50*b* are then attached to the first row of coil 12 by suitable fastening mechanism such as welds, and the connection member 50c, 50d are attached to the second row of coil 14 by suitable fastening mechanism such as welds.

It is to be understood that although the connection members 50a, 50b and the connection members 50c, 50d are positioned alternately in FIGS. 5 and 6, they can be positioned in other arrangements, such as the connection members 50a, 50b being positioned next to each other, and the connection members 50c, 50d being positioned next to each other.

Referring to FIGS. 1 and 3-4, the mounting member 54 is then attached to the connection members by suitable fastening mechanisms, such as inserts 64 and screws 66, with the first barrier sheet 56 attached to the attachment side 21 to prevent airflow from exiting from the interior space 31 formed between the first and second rows of coil 12, 14 at the attachment side 21.

Referring to FIG. 1, in some embodiments, the mounting member 54 serves to provide drainage surfaces 70 to facilitate drainage of condensates formed on the mounting member 54, such as by gravity.

A number of embodiments of the mounting assembly have been described. Nevertheless, it will be understood that various modifications may be made without departing from the spirit and scope of the embodiments and examples described herein.

The invention claimed is:

1. A mounting assembly for mounting a multi-row heat exchanger coil to a desired wall surface, wherein the multi-row heat exchanger coil including a first row of coil, a second row of coil, a bent portion that fluidly communicates the first and second rows of coil to each other, an interior space formed between the first and second rows of coil and an attachment side where the mounting assembly is attached, the mounting assembly comprising:
   a plurality of spaced apart connection members disposed along a side of the multi-row heat exchanger coil, each of the plurality of spaced apart connection members having first and second ends opposite to each other, with the first end attached directly to an outermost tube of the first row of coil and the second end attached directly to an outermost tube of the second row of coil, thereby securing the first and second rows of coil to each other;
   a mounting member configured to prevent airflow from exiting from the interior space at an attachment side; and
   fastening mechanism configured to attach the mounting member to each of the plurality of spaced apart connection members.

2. The mounting assembly of claim 1, wherein the mounting member comprises a first barrier sheet configured to prevent airflow from exiting from the interior space and a second barrier sheet configured to prevent airflow from bypassing the multi-row heat exchanger coil from the attachment side.

3. The mounting assembly of claim 1, wherein at least one of the plurality of spaced apart connection members is located in a vicinity of the bent portion.

4. The mounting assembly of claim 1, wherein the mounting member includes drainage surfaces to facilitate drainage of condensates formed on the mounting member by gravity.

5. The mounting assembly of claim 2, wherein the first barrier sheet includes an cutout area configured to allow a refrigerant inlet tube or a refrigerant outlet tube to pass through the first barrier sheet.

6. A multi-row heat exchanger coil, comprising:
   a first row of coil;
   a second row of coil positioned generally parallel to the first row of coil;
   a bent portion fluidly communicating the first and second rows of coil;
   an interior space formed between the first and second rows of coil; and
   a mounting assembly comprising:
   a plurality of spaced apart connection members disposed along a side of the multi-row heat exchanger coil, each of the plurality of spaced apart connection members having first and second ends opposite to each other, with the first end attached directly to an outermost tube of the first row of coil and the second end attached directly to an outermost tube of the second row of coil, thereby securing the first and second rows of coil to each other;
   a mounting member configured to prevent airflow from exiting from the interior space at a side of the multi-row heat exchanger coil; and
   fastening mechanism configured to attach the mounting member to each of the plurality of spaced apart connection members.

7. The multi-row heat exchanger coil of claim 6, wherein the mounting member comprises a first barrier sheet configured to prevent airflow from exiting from the interior space and a second barrier sheet configured to prevent airflow from bypassing the multi-row heat exchanger coil from the attachment side.

8. The multi-row heat exchanger coil of claim 6, wherein at least one of the plurality of spaced apart connection members is located in a vicinity of the bent portion.

9. The multi-row heat exchanger coil of claim 6, wherein the mounting member includes drainage surfaces to facilitate drainage of condensates formed on the mounting member by gravity.

10. The multi-row heat exchanger coil of claim 7, wherein the first barrier sheet includes an cutout area to allow a refrigerant inlet tube or a refrigerant outlet tube to pass through the first barrier sheet.

11. A method of assembling the multi-row heat exchanger coil of claim 6, wherein the multi-row heat exchanger coil includes a connection section that fluidly communicates the first and second rows of coil to each other, the method comprising:
   attaching the first end of the respective connection member to the outermost tube of the first row of the multi-row heat exchanger coil before the first row of coil is folded onto the second row of coil;
   bending the connection section to form a bent portion, thereby allowing the first and second rows of the multi-row heat exchanger coil to be folded onto each other;
   attaching the second end of the respective connection member to the outermost tube of the second row of the multi-row heat exchanger coil, thereby securing the first and second rows of coil to each other; and
   attaching the mounting member to the respective connection member by the fastening mechanism.

12. The method of claim 11, further comprising preventing airflow from exiting from the interior space with a first barrier sheet, and preventing airflow from bypassing the multi-row heat exchanger coil from the attachment side with a second barrier sheet.

13. The method of claim 11, further comprising attaching at least one of the plurality of spaced apart connection members in a vicinity of the bent portion.

14. The method of claim 11, further comprising attaching the mounting member to allow drainage surfaces to be formed to facilitate drainage of condensates formed on the mounting member by gravity.

* * * * *